March 7, 1950 A. E. MEINZER 2,499,600
MOLTEN SLAG GRANULATOR APPARATUS
Filed Feb. 28, 1947 3 Sheets-Sheet 1
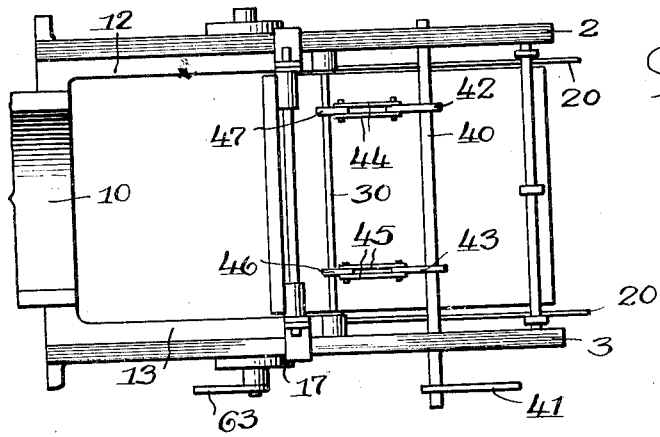
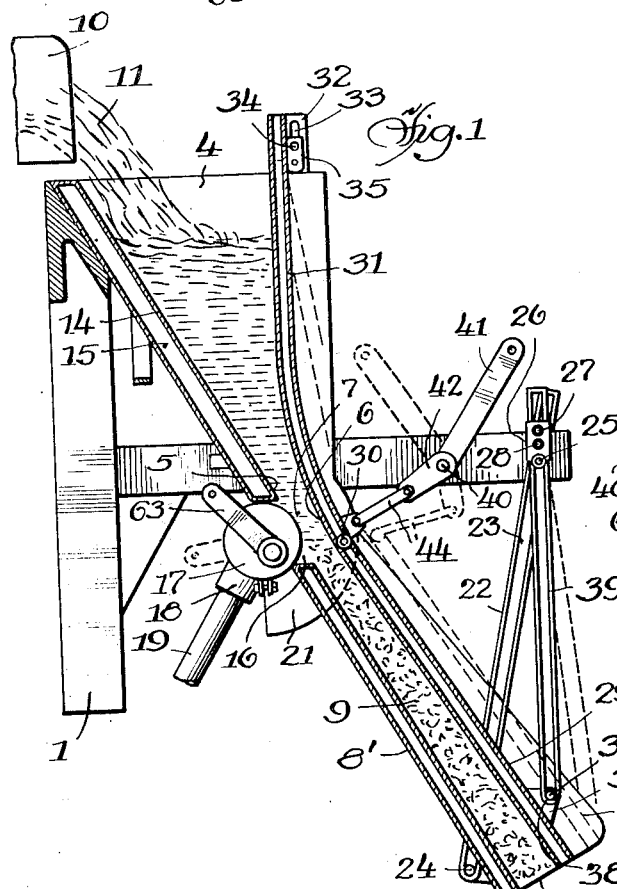
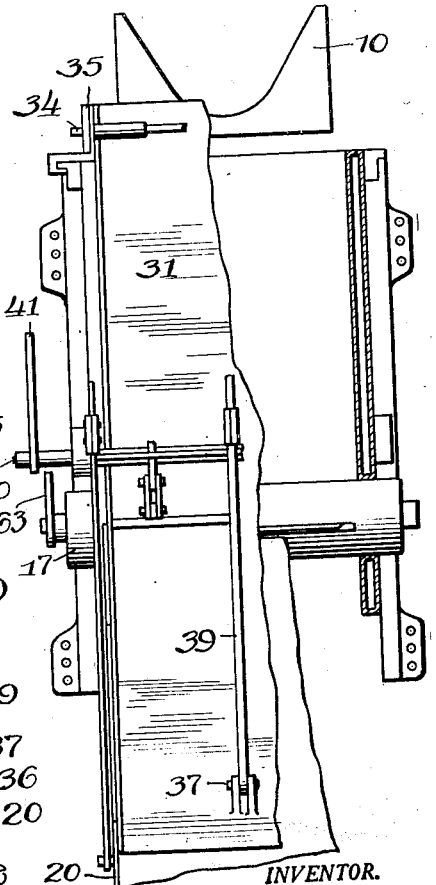
INVENTOR.
Arthur E. Meinzer
BY Chritton, Schroeder, Merriam & Hofgren
Attys.

March 7, 1950 — A. E. MEINZER — 2,499,600
MOLTEN SLAG GRANULATOR APPARATUS
Filed Feb. 28, 1947 — 3 Sheets-Sheet 2
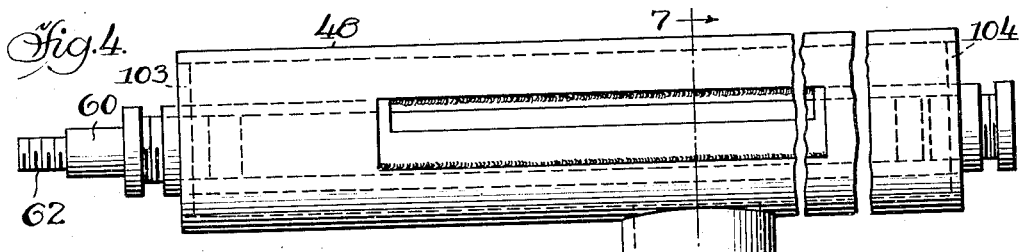
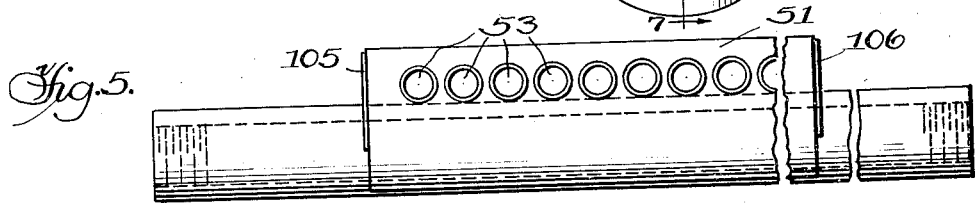
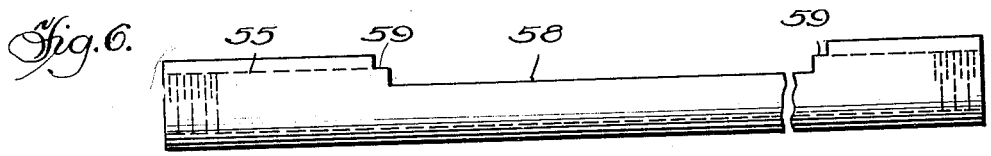
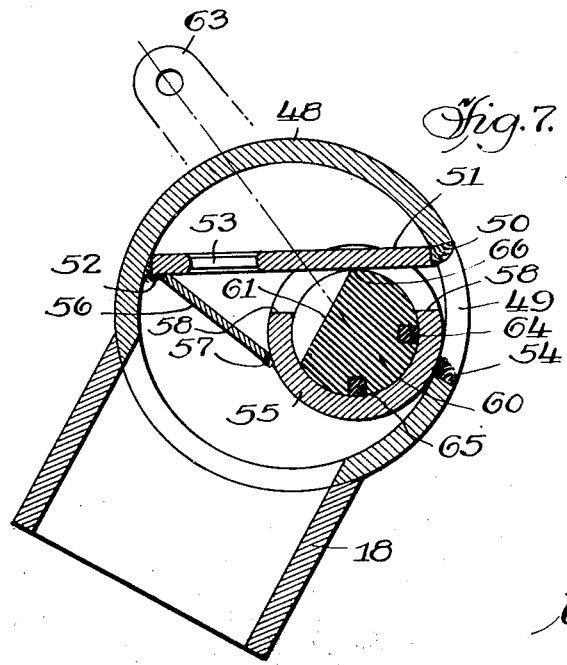
INVENTOR.
Arthur E. Meinzer
BY Chritton, Schroeder, Merriam & Hofgren
Attys March 7, 1950 — A. E. MEINZER — 2,499,600
MOLTEN SLAG GRANULATOR APPARATUS
Filed Feb. 28, 1947 — 3 Sheets-Sheet 3

INVENTOR.
Arthur E. Meinzer,
BY Chritton, Schroeder,
Merriam & Hofgren
Attys.

Patented Mar. 7, 1950

2,499,600

UNITED STATES PATENT OFFICE 2,499,600

MOLTEN SLAG GRANULATOR APPARATUS

Arthur E. Meinzer, Chicago, Ill.

Application February 28, 1947, Serial No. 731,624

12 Claims. (Cl. 18—2.5)

This invention relates to an apparatus for granulating molten material and, while not limited thereto, is particularly adapted for granulating molten slag and the like.

Slag is generally a by-product derived in the course of smelting or refining ores, etc., such as iron, copper, phosphate, and other ores and the like. As such, it is composed of all the impurities originating in the given ore or mineral refined. A similar material, having comparative chemical composition and physical properties, is produced in the recent art of melting "fly-ash" or "ash," the by-product or refuse arising from the burning of coal for power purposes, etc. A slag may also be produced synthetically by melting silicates, calcium compounds, aluminates, etc., in the proper proportions. Slag may also be produced in other ways familiar to those skilled in the art. I wish it understood that the present invention is not limited to the processing of any particular one of the many types of slags, however, for illustrative purposes only, the slag derived in the course of smelting iron and more commonly known as "blast furnace slag" or "cinder" will be described herein as an example, because it is the most commonly known and more widely exploited.

The art of granulating molten slag or the like by contact with water or other chilling medium is well known, the commonest method being that of introducing a flow of molten slag into a comparatively large volume of water. The product thus formed is objectionable in that it retains a high percentage of moisture or water. In order to produce a product in either the dry state or relatively free of moisture it is desirable to subject the molten slag to contact with a limited amount of water or other chilling medium. However, when accomplishing this under circumstances that afford little or no restrictions to expansion, most slags have the characteristic of instantly forming into particles or masses having large, irregular, cell structures. Due to its density, material of this nature is of little value.

In the present invention, molten slag or the like is introduced into a relatively large area or receiving container from which it passes through a relatively smaller area or throat near which it is immediately brought into intimate contact with a limited amount of water or other chilling medium reacting through a chilling area having a selectively adjustable ratio of expansion or contraction until finally discharged from the apparatus. These areas are located in a direct flow line or passageway through which the molten slag passes. My present apparatus is so constructed that any tendency for a reversal of reaction is blocked by the momentum of the flow or head of the slag in the upper receiving container. Therefore, as steam is generated at the point of contact of the molten slag and the chilling medium or water within the relatively confined area or throat, and the further chilling area confining the flow through the expansion or contraction area to the discharge, the ensuing pressure thus built up limits the expansion of the granular particles until they have set through sufficient cooling, the distance from the point of chilling contact to the discharge being great enough to allow sufficient time for chilling the granulated particles beyond further expansion after reaching the outside atmosphere. Since the throat area, water velocity and quantities are instantly variable at will, together with the fact that the expansion and contraction ratio maintains its selective setting, accurate control may be imparted to the finished material through the capacity range of the apparatus. It is thus clear that the molten material is brought into intimate contact with a chilling medium within a space so confined that the ensuing expansion creates a pressure to limit the expansion of the resultant granular material without the addition of applied power except that latent in the molten material in the form of heat.

Among the objects of my invention are: to provide a novel and improved method and apparatus for granulating molten material; to provide an apparatus for granulating molten material wherein the molten material is brought into intimate contact with a chilling medium within a space so limited that the ensuing expansion is contributory toward limiting the expansion of the resultant granular material without the addition of applied power except that latent in the molten material and chilling medium; to provide, in a granulating apparatus of the type referred to, for the utilization of the expansion resulting from contact of a chilling medium with the molten slag for limiting the expansion of the granular material through and out of a chilling zone; to provide an improved apparatus for controlling the amount of flow area in a throat portion and for controlling the spray of the chilling medium into the stream of molten material in the throat portion and chilling chamber; to provide apparatus in which the passageway through which the molten slag and the like passes may be selectively varied in cross-sectional flow area; to provide means for varying the angle of outlet of the granulated slag and the like; to provide an improved structure and arrangement of nozzle for introducing a chilling medium into a flowing stream of molten material; to provide means for facilitating the cleaning of the passageway through which the molten stream flows; and such further objects, advantages and capabilities inherently possessed by my invention, as will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 1 is a vertical longitudinal section of a preferred form of my invention, parts being shown in elevation for the sake of clearness.

Fig. 2 is a front elevation looking toward the right hand side of Fig. 1, a portion being shown in section for the sake of clearness.

Fig. 3 is a top plan view of Fig. 1.

Fig. 4 is a front elevation of the nozzle member, partly broken away.

Fig. 5 is a top plan view, partly broken away, of the inner portion of the nozzle member and omitting the outer shell and the rotatable shaft.

Fig. 6 is a detailed elevation, partly broken away, of the inner tube of the nozzle member.

Fig. 7 is an enlarged section on the line 7—7 of Fig. 4.

Figure 8:
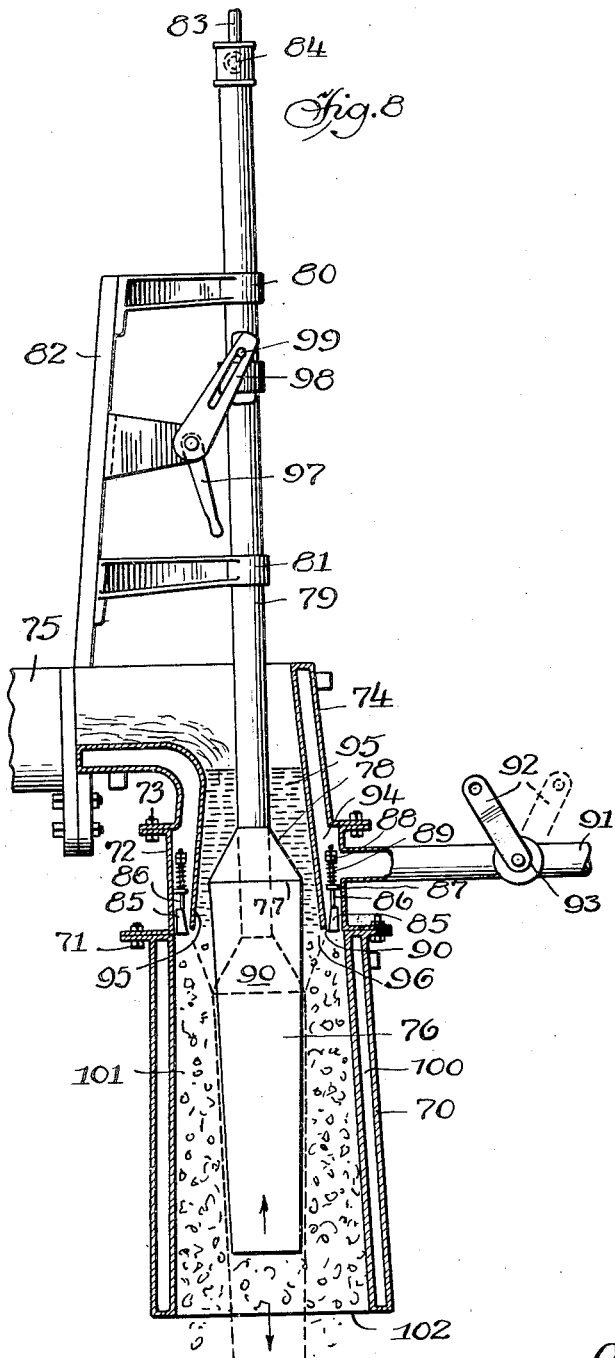
Fig. 8 is a vertical section, partly in elevation, of a modified form of my apparatus.

In the form of my invention shown in Figs. 1–7, there is provided a supporting frame 1 having a pair of forwardly extending beams 2 and 3 which frame will be mounted upon any suitable foundation or other support. Fixedly mounted in the upper portion of the frame 1 is a receiving container or hopper 4 having an open interior formed with an enlarged upper end and decreasing in cross-sectional area downwardly to a restricted lower end 5, immediately below which is mounted the throat member 6 having a restricted throat opening 7. Immediately below the throat portion is a chilling member 8 having on its interior a longitudinally extending passageway 9 serving as a chilling chamber. The hollow interior of the receiving container or hopper 4, the throat opening 7 and the chilling chamber 9, form a continuous passageway for passage of the slag downwardly therethrough.

Mounted above the hopper 4 is a trough 10 of any suitable construction for discharging molten slag 11 from any suitable source of supply to the interior of the hopper or container 4. The sides 12 and 13 of the hopper 4 are preferably parallel, and the rear wall 14 is inclined downwardly and toward the right as viewed in Figs. 1 and 3. Wall member 14 is preferably provided with a space 15 through which water or other cooling medium may be circulated as desired. The throat opening 7 due to the downward tapering formation of the hopper is restricted in cross-sectional area and is formed with an opening 16 extending across the rear face of this portion of the apparatus. In opening 16 is positioned a nozzle member 17 in the bottom of which is fixed a short sleeve 18 receiving a pipe 19 connected to any suitable source of chilling medium such as water and the like. While water is preferred as the chilling medium, it would be understood that other forms of chilling medium may be introduced either through the nozzle or through other suitable openings, examples of such other chilling mediums being air, steam, gases and the like.

The chilling chamber casing 8 extends downwardly from the bottom edge of the throat opening 16 and is composed of the bottom or rear wall 8' and two side walls 20 as seen in Figs. 1–3. The chilling member 8 is swingably connected in any desired manner at its upper end with the downwardly extending extension walls 21 (one on each side) at the lower end of the hopper 4. This swingable mounting is such as to enable the chilling member 8 to swing through a substantial angle, which preferably is from a downwardly extending vertical position to a horizontal position extending toward the right as viewed in Fig. 1.

This swinging movement of the chilling member is accomplished by a pair of elongated slotted link members 22 pivotally connected with the lower end of the bottom wall of the chilling member. The upper end of the link 22 is positioned with its slot 23 extending over the sides of rod 25 upon which rod the closed upper end of the slot rests when the chilling member is at its lowermost position. As viewed in Fig. 1 the upper end of each of the links 22 is shown extending a distance above rod 25, which means it is capable of further downward adjustment. In order to fix the two links in any desired adjusted position there is provided a slide member 26 for each of these links, these slide members being pivotally mounted on rod 25 which rod is mounted at its ends in side supporting members 2 and 3. These slide members slidably encompass the links 22 and are provided with means for holding these links in any up and down adjusted position, such as bolts 27 and 28 having heads and nuts on opposite sides of the slide members to clamp the latter against the sides of the links to grip thereagainst. It is thus seen that the links 22 may be adjusted upwardly and downwardly any desired extent within the limits of the length of the elongated slot 23 in order to vary the angle at which the chilling member stands with relation to the hopper 4. The chilling member is formed in its upper forward face with a movable upper wall 29 which is pivoted at 30 to the lower end of the adjustable front wall 31 of the hopper. Wall 31 is pivotally supported at its upper end to the supporting members 32 (one on each side of the upper edge of the hopper), these supporting members each having a vertically extending slot 33 to permit a limited up and down movement of the upper end of front wall 31 through the medium of the bolt 34 passing through slot 33 and carried by the ear 35 fixed upon the upper end of wall member 31.

The lower outer face of the adjustable wall 29 of the expansion member is provided with a lug 36 carrying a pin 37 supported in the closed lower end 38 of the slotted link 39 which is similar in construction to that described above in connection with the links 22. This construction enables the link 39 to be raised or lowered as desired to slidably move the front wall 29 of the chilling member a greater amount inwardly or outwardly of the side walls 20, front wall 29 swinging on pivot 30 during this movement.

It will be understood that by desired manipulation of link 39 the front wall 29 will be raised or lowered in relation to the bottom or rear wall 8' of the chilling chamber 8 through pivot 30.

This manipulation establishes a definite expansion or contraction ratio between the entrance and exit cross-section areas of chamber 8. When the throat opening is small, for instance, one to one and one-half as compared to the discharge opening, as shown in Fig. 1, the ratio is considered to be an expansion one. Conversely, when the throat opening is large for instance one and one-half to one as compared to the discharge opening the ratio is considered to be a contraction one. This ratio is adjustable to the type of molten material to be granulated. In the case of a violently reacting molten material that has characteristics of foaming on contact with a chilling medium this ratio may be set one to one, or one and one-half to one, or other desired ratio. This increases the reactive pressure in the chilling section to the point of preventing undue expansion of the resultant granular material. In the case of a mildly reactive molten material this ratio may be set to one to one and one-quarter or greater, in order that the reactive pressure may not offer too great a limitation to the expansion of the resultant granular material. This ratio is, more or less, definitely maintained by pivot points 25 and 35 through any selective, normal operating, throat opening 7 conditions. Further, attention is called to the method of loosely supporting front wall 29 of the chilling chamber 8 through the link 39 and the pivot 30. The front wall is of sufficient weight, or may be counter weighted, to the point where the reactive pressure within member 8 may tend to cause it to float free of supporting link 39, thereby automatically establishing an expansion or contraction ratio in proportion to the reactive pressure within the chilling area 8, and thus, to the flow of material passing therethrough. This feature also affords a safeguard against any tendency of a reversal of reaction in the event the reactive pressure should tend to become too great.

It will be thus seen that by desired manipulation of the links 22 and 39 the chilling member may be moved in various angular positions to change the angle of discharge of the granulated material therefrom, and also increase the size of the interior cross-section of the chilling chamber by swinging the front wall 29 on its pivot 30 independently of links 22. This enables a wide variation in the angular positions of the chilling member and its front wall, and also a wide variation in the cross-sectional area of the same. It is also to be noted in Fig. 1 that, as the pin 37 of lug 36 of the movable wall 29 is freely movable upwardly in the slot in the slotted link 39, the movable member 29 will adjust itself automatically, under certain conditions, and in effect float upon the resultant pressure and slag in the chilling chamber, and move inwardly and outwardly with changes in said resultant pressure.

Rotatably mounted between the side supporting members 2 and 3 is a rod 40 extending outwardly a greater distance at one end beyond the side member 3 and having fixed on said projecting end an arm 41 for rotating rod 40 as desired. Between the side supporting members 2 and 3 there are fixed to rod 40 a pair of spaced apart arms 42 and 43 connected by pivoted links 44 and 45 to similar arms 46 and 47 which in turn are fixed to the lower end of the front wall 31 of hopper 4. It is thus seen that by rotating handle 41 the front wall 31 of the hopper 4 will have its lower portion swing outwardly to increase the size of the cross-sectional interior of the throat member and at the same time increase the size correspondingly of the hopper interior, as the lower end of the front wall 31 of the hopper and the upper end of the adjustable front wall 29 of the chilling member are pivotally connected at 30. This movement of the front wall 31 of the hopper will be accompanied by a corresponding movement of the front wall 29 of the chilling member. The rear wall 8' of the expansion member and the front wall 29 will each preferably be formed with an open space therein forming a water jacket through which cooling water or other cooling medium may be circulated in order to prevent overheating of these parts by the molten slag passing therethrough. The side walls of the chilling member and the side walls of the hopper may likewise be cooled if desired.

The construction of the nozzle member indicated generally as 17 in Fig. 1 will be understood from Figs. 4–7. In Fig. 7 it will be seen that this nozzle member comprises an outer casing or shell 48 of tubular formation and elongated as seen in Fig. 4. This shell member 48 is formed in its front portion, which in Fig. 1 faces toward the throat 7, with an elongated slot or opening 49. Fixed at 50 in the upper edge of slot 49 by welding or the like is the front edge of metal plate 51 extending across the interior of the shell 48 and secured by welding or the like at 52 to the opposite side of the interior of this shell. Plate 51 as seen in Fig. 5 is formed with a plurality of holes 53 preferably arranged in an aligned row and positioned toward the rear edge of this plate. Also fixed to the lower edge of the slot 49 by welding or the like as at 54 is a tube 55 extending along the interior of the shell 48. This tube is further fixed in position by a metal plate 56 which is welded or otherwise fixed at 52 at its upper end to the shell 48 and plate 51, and at its lower end at 57 to tube 55. This structure firmly fixes tube 55 and plates 51 and 56 in position in shell 48.

Tube 55 as viewed in Fig. 6 has the intermediate portion of its upper side partially cut away to form the depressed edges 58 (one on the front side and one on the rear side) and a pair of shoulders 59 at the ends of the depressed portion forming seats to receive the ends of the plate 51 when these parts are being assembled in position. Rotatably mounted in tube 55 is a longitudinally extending valve shaft 60 having a cut away portion 61 along a substantial portion of one side. This valve shaft extends outwardly beyond the end of the casing shell 48 as seen at the left hand side of Fig. 4 at which extending end is fixed, by a nut seated on threads 62, a handle member 63 which when moved will rotate this shaft a desired amount.

When shaft 60 is rotated into the position shown in Fig. 7 the upper edge of its uncut circumference touches and slightly bears against the lower face of plate 51 throughout the length of the cut away portion in shaft 60. Shaft 60 is also formed with suitable packing strips 64 and 65 of leather or other suitable material to prevent leakage between these parts. As stated above, slot 49 of the tubular shell 48 is positioned so as to communicate with the interior of throat 7. It is also to be noted that the cut away portion 58 of tube 55 is positioned just inwardly of the slot 49. Rotation of shaft 60 by handle 63 in a clockwise direction as viewed in Figs. 1 and 7 will move the upper edge 66 of shaft 60 in a circular path to open the nozzle. This means that the opening between said upper edge 66 of shaft 60 and the lower face of plate 51 gradually increases from zero to any desired amount depending upon the amount of rotation of handle 63. Rotation in the opposite direction will correspondingly close the nozzle.

When this opening is slight, a slight spray of water or other chilling medium will be forced into the molten slag passing through throat 7. When desired, a larger and heavier spray of water can be forced into throat 7 by further rotation of handle 63 to give a larger opening between edge 66 and plate 51. It is thus seen that I have provided means for effectively controlling the amount of spray of chilling medium into the throat and have enabled close regulation thereof.

Figure 9:
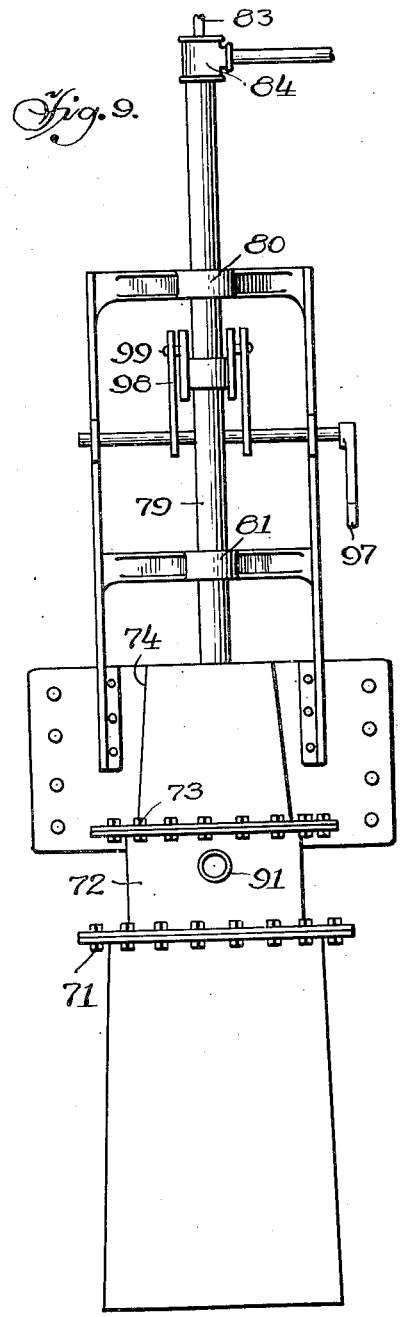
Fig. 9 is a front elevation looking toward the right hand side of Fig. 8.

In the form of my invention shown in Figs. 8 and 9 the expansion member 70 is fixed by bolts 71 to the lower edge of the sleeve 72 which sleeve in turn is fixed by bolts 73 to the upper portion of the molten slag receiving container or hopper 74 receiving molten slag from the trough 75 which in turn connects to any suitable source of molten slag. The hopper 74 tapers downwardly and outwardly to its lower end and has positioned for vertical adjustment therein an inner core adjusting member 76 longitudinally tapered downwardly for a substantial length at its lower end from the circumferential line 77 from which it tapers upwardly and inwardly at 78 to the upwardly extending tubular portion 79 which is vertically slidable in the supporting members 80 and 81 fixed to the upright 82 of the superstructure which in turn is mounted upon the supporting frame. The inner core adjusting member 76—78 is preferably hollow on the interior and has a cooling medium circulated therewithin which may pass inwardly through the tube 83 and after circulating around and along the interior of the adjusting member may pass out of the outlet 84.

The lower edge portion of the outer wall of the connecting sleeve 72 and the lower edge portion of the inner wall of the hopper 74 are spaced apart and closed except for openings receiving the tapered nozzle members 85 fixed to the lower end of the stems 86 slidably mounted in ears or annular flanges 87. The upper end of stems 86 are each formed with an adjusting nut 88 between which and flange 87 is mounted a coil spring 89 for normally holding the nozzle members 85 the desired distance upwardly to close the nozzle opening 90. When water or other chilling medium is forced through pipe 91 by operation of the handle 92 which operates any suitable form of valve within the valve casing 93, this water passes inwardly through the interior space 94 and forces the nozzle members 85 downwardly an amount depending upon the pressure of the water therein, and upon the strength of the springs 89. It is thus seen that I have provided a novel arrangement of nozzle control for injecting chilling medium into the molten slag 95 within the throat portion 96 through which this slag is passing.

Tube or hollow stem 79 which carries the adjusting member 76—78 is given an up and down movement by handle 97 through the medium of arms 98 having slotted connection with the ends of pin 99 so positioned as to cause up and down movement of stem 79 as handle 97 is rotated. Other suitable means for effecting vertical adjustment of stem 79 may be used as desired.

In the form shown in Figs. 8 and 9 the side walls of the molten slag hopper are formed with passageways communicating with the space 94 so that water may be circulated therearound for cooling purposes. The chilling chamber member 70 also has a cooling space 100 for water or other cooling medium. The molten slag passes downwardly from the interior of the hopper 74 into and through the throat 96 where it receives a spray of water or other chilling medium which contacts the stream of molten slag at this point and causes it to be broken up into globules, pellets, granules and the like. The steam resulting from this contact of the chilling water with the molten slag causes an expansive force to be set up in the chilling chamber or area 101 which expansive force accelerates the speed of movement of these granules to and through the discharge end 102 of the expansion member 70. The flow area through the throat 96 and the space immediately in the rear thereof will be so controlled by vertical adjustment of the adjusting member 76—78 so as to prevent any blowback or reversal of direction of travel of the stream of molten slag. The construction described of the nozzle members 85 and associated parts is such as to produce pressure operated fixed pitch constant velocity nozzles at these points. As stated above, the amount of liquid spraying through these fixed pitch nozzles will be regulated by regulating the pressure of the water through the pipe 91 and by the adjustment of the valve arm 92. To illustrate the adjustability of the adjusting member 76—78 the same is shown in lower position by the dotted lines and in upper operative position in solid lines. It will be understood, however, that any degree of vertical adjustment within the limits of the mechanism described above for moving the stem 79 may be accomplished as desired, greater or less than those shown in the solid and dotted lines in Fig. 8. In the form shown in Fig. 8 the throat 96 and parts adjacent thereto are annular in form, however, other cross-sectional shapes may be used as desired.

In the forms shown in Figs. 1–3 the throat and adjacent portions of the molten slag passageway are of the flat type with adjustment for flow area through the molten slag passageway. In this form, as will be better appreciated in Fig. 7, the chilling medium (water or other suitable medium) will pass inwardly through the pipe 19 and tubular connection 18 to the interior of the tubular shell 48, it being understood that tube 48 is closed at its ends by suitable discs 103 and 104. Also the space between plate 51, plate 56 and tube 55 is closed at its ends by the closure plates 105 and 106. This causes the water or other chilling medium upon entry into the shell 48 to pass above plate 51 then downwardly through holes 53 where it is deflected by the inclined plate 56 to the right as viewed in Fig. 7 through the opening in the upper portion of tube 55 where, it is prevented from further passage if the tubular valve member 60 is closed and in the position shown in Fig. 7. Rotation of the handle 63 at one end of the shell 48 in a clockwise direction as viewed in Fig. 7 will open the cylindrical valve member 60 any desired degree to force a spray of water through the slot 49 in the shell 48. This spray of water is directed into the throat 7 where it will chill the molten slag passing through this throat and convert it into globules, pellets, granules and the like. The steam formed by the contact of the chilling medium with the molten slag will create a limiting atmosphere to limit the expansion of these granules within the chilling member 8. The parts are so arranged as to cause sufficient build-up of molten slag in the hopper 4 to prevent blow-back or reversal of direction of travel of the molten slag in the passageway. It is thus seen that molten slag is introduced into a relatively large area or receiving container from which it passes downwardly through a relatively smaller area or throat where it is brought into intimate contact with a limited amount of water directed against the stream of molten slag laterally thereof (see Figs. 1 and 7) said stream of molten slag then passing through a chilling area until finally discharged from the apparatus. These areas constitute a direct flow line, and as stated above, any tendency for a reversal of flow of the stream of molten slag is blocked or prevented by the momentum of the flow or head of the introduced slag. This enables the expansive force, ensuing from the contact of the water with the molten slag, to exert itself toward the outlet end of the passageway imparting a limiting atmosphere to the granular particles thus formed. I am able to accomplish accurate control of the finished material during the time of processing by varying at will the cross-sectional flow areas, the water velocity and the quantities of molten slag being introduced. This apparatus consists of a minimum number of replaceable and easily accessible parts and requires no power other than that imparted to the water supply.

In the form shown in Fig. 8 movement of the adjusting member 76 to the desired extent, and enlargement of the cross-sectional area of the expansion chamber 9 in the form shown in Fig. 1, will so enlarge the effective areas at these points as to greatly facilitate cleaning out of the inside of the apparatus if desired between runs. The action of the water through the nozzles in the form shown in Fig. 8 is similar to placing one's finger over the end of a hose having water under pressure flowing therethrough and permitting pressure of the water to move the finger a required amount away from the end of the hose. This is done in Fig. 8 by the spring loaded nozzle members 85. The action of the nozzle in the form shown in Fig. 1 is similar to squeezing together the open end of a garden hose or the like and controlling the spray therefrom by the extent of such squeezing action applied to the end of the hose. This will be better understood from Fig. 7 in which the size of the spray is controlled by rotation of the rotatable valve member 60.

I claim:

1. Apparatus for granulating molten slag, comprising, a receiving container, a chilling chamber having a stationary inclined rear wall and stationary side walls fixed to the rear wall, a movable front wall, means for moving the front wall with relation to the rear and side walls, a restricted throat portion between said container and chamber and in communication with each thereof for the passage of molten slag therethrough, and means for spraying a chilling medium into the molten slag passing through the throat portion.

2. Apparatus for granulating molten slag, comprising, a receiving container, a chilling chamber, a restricted throat portion between said container and chamber and in communication with each thereof, an elongated nozzle in communication with the interior of said throat portion and extending transversely thereof, means for introducing a chilling medium under pressure into the nozzle, a flat stationary plate in said nozzle, and an elongated rotatable member adjacent said plate for selectively varying the amount of opening in the nozzle to control the amount of spray through the nozzle into the molten slag passing through the throat portion.

3. Apparatus as claimed in claim 2, having means for varying the size of opening in the throat portion.

4. Apparatus as claimed in claim 2, having means for varying the size of opening in the chilling chamber.

5. Apparatus as claimed in claim 2, in which one of the walls of the chilling chamber is movable, and means for selectively changing the position of said wall.

6. Apparatus for granulating molten slag and the like, comprising a molten slag receiving container having a movable wall, a chilling chamber having a movable wall, a restricted throat portion between the container and chamber and in communication with both thereof, said throat portion having a movable wall, and means for moving said walls, and means for introducing a chilling medium into the slag in said throat portion.

7. Apparatus for granulating molten slag and the like, comprising a molten slag receiving container, a chilling chamber, a throat portion between said container and chamber and communicating with both thereof, said container, throat portion and chilling chamber having a continuous passageway therethrough which is restricted in flow area at the throat and increases in size to the outlet of the chilling chamber, and means for varying the effective cross-sectional area of the container, throat and chilling chamber together as a unit.

8. Apparatus for granulating molten slag, comprising, a receiving container, a chilling chamber having main walls and a wall movable with relation to said main walls, means for adjustable moving said movable wall with relation to the main walls to increase and decrease the size of the chilling chamber, a restricted throat portion between said container and chamber and in communication with each thereof for the passage of molten slag therethrough, and means for spraying a chilling medium into the molten slag passing through the throat portion.

9. Apparatus for granulating molten slag, comprising, a receiving container, a chilling chamber having confining walls, means for moving one of said walls angularly with relation to the other walls to vary the cubical size of the chilling chamber, a restricted throat portion between said container and chamber and in communication with each thereof for the passage of molten slag therethrough, and means for spraying a chilling medium into the molten slag passing through the throat portion.

10. Apparatus for granulating molten slag, comprising, a receiving container, a proportionately adjustable chilling chamber, a restricted throat portion between said container and chamber and in communication with each thereof, the whole being selectively adjustable as a unit as to cross-sectional areas, a nozzle in communication with the interior of said throat portion, means for introducing a chilling medium under pressure into the nozzle, a stationary surface within said nozzle, a movable surface within the nozzle mounted to vary its angle with said stationary surface to direct and control a spray of chilling medium transversely in said throat portion and into intimate contact with the molten slag passing through the throat portion.

11. Apparatus for granulating molten slag, comprising, a receiving container, a chilling chamber, a restricted throat portion between said container and chamber and in communication with each thereof, a nozzle in communication with the interior of said throat portion, means for introducing a chilling medium under pressure into the nozzle, a stationary surface within said nozzle, a movable surface within the nozzle mounted to vary its angle with said stationary surface to direct and control a spray of chilling medium transversely in said throat to the flow of slag through the throat portion and into intimate contact with the molten slag passing through the throat portion.

12. Apparatus for granulating molten slag as claimed in claim 9, in which the movable wall is automatically moved by changing pressures in the chilling chamber.

ARTHUR E. MEINZER.

REFERENCES CITED

The following references are of record in the file of this patent:

UNITED STATES PATENTS

| Number | Name | Date |
|---|---|---|
| 322,235 | Wilson | July 14, 1885 |
| 812,650 | Hamfeldt et al. | Feb. 13, 1906 |
| 1,744,397 | Lufkin | Jan. 21, 1930 |
| 1,950,932 | Schott | Mar. 13, 1934 |
| 1,979,251 | Chapline | Nov. 6, 1934 |
| 2,044,450 | Schol | June 16, 1936 |
| 2,215,223 | Lytle | Sept. 17, 1940 |
| 2,417,301 | Hayes | Mar. 11, 1947 |